Nov. 15, 1932.   R. E. EVANS   1,887,924
JACK TRACK
Filed Dec. 16, 1929
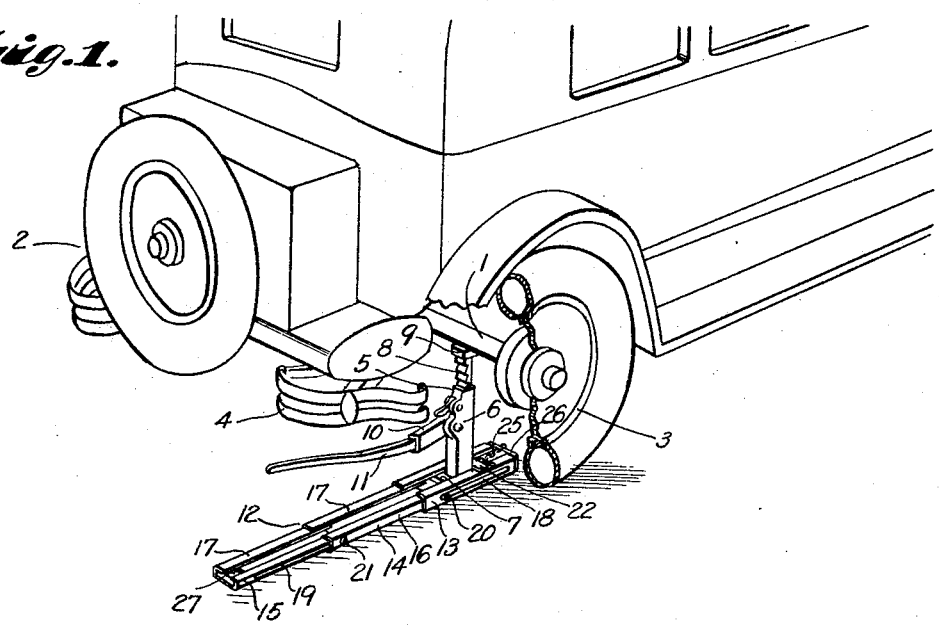
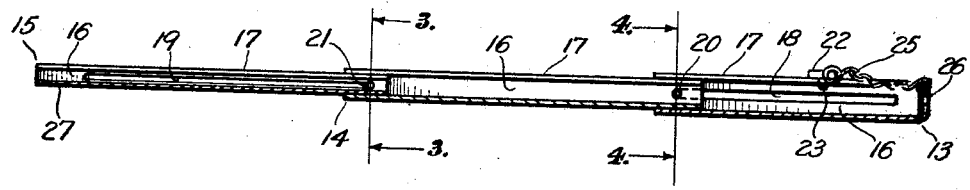
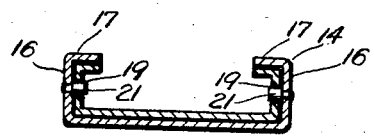
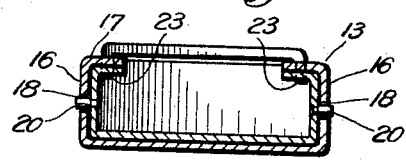
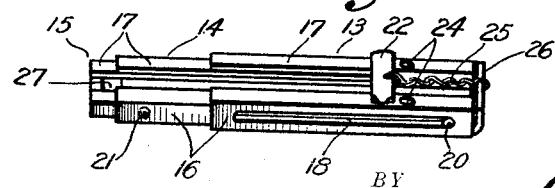
INVENTOR
Rollo E. Evans
BY
ATTORNEY Patented Nov. 15, 1932

1,887,924

UNITED STATES PATENT OFFICE

ROLLO E. EVANS, OF EMPORIA, KANSAS

JACK TRACK

Application filed December 16, 1929. Serial No. 414,424.

My invention relates to jacks, and more particularly to devices for supporting jacks, and has for its principal objects to facilitate installation of a jack beneath an axle for elevating a portion of a vehicle.

Much difficulty and inconvenience are involved in placing a jack in correct position beneath a motor car axle, particularly in the dark or when a bumper extends a substantial distance in front of the axle. Further objects of my invention therefore are to assure location of a jack in correct operating position beneath an axle.

Installation of a jack is troublesome and proper operation of the jack is uncertain, when the soil at the jack position is soft or rough, and further objects of my invention therefore are to support a jack firmly on soft or rough ground and to facilitate the installation of a jack in functioning position on irregular or soft ground.

Guides and base members for jacks have sometimes been provided, which are cumbersome and not easily handled or stored in automobiles. Further objects of my invention therefore are to reduce the bulk and weight of a jack support, and to facilitate manipulation of a collapsible support for use or storage.

In accomplishing these and other objects of the invention, I have provided improved details of structure, the preferred forms of which are illustrated in the accompanying drawing, wherein:

Fig. 1 is a perspective view of the rear portion of an automobile and my improved jack support installed under the rear axle and illustrated as supporting a jack, parts of the automobile being broken away to better illustrate the operation of the invention.

Fig. 2 is a longitudinal vertical section of the jack support in extended position.

Fig. 3 is a section on the line 3—3, Fig. 2.

Fig. 4 is a section on the line 4—4, Fig. 2.

Fig. 5 is a perspective view of the support when collapsed.

Referring in detail to the drawing:

1 designates a member to be engaged by the lifting shaft of a jack, and is illustrated as the rear axle of an automobile designated 2 having a wheel 3 and a rear bumper 4.

A jack 5 of ordinary construction including a standard 6 and a plate-like base 7, a lifting shaft 8 having a head 9, and a lever arm 10, may be installed directly below the axle for elevating the wheel from the ground.

The lever of a jack of this character is adapted to receive a handle 11 which may extend beyond the bumper and thus be easily accessible for operating the jack.

My invention comprises a guide or base 12 adapted to lie on the ground and serve as a track or chute on which the jack may be mounted and moved and comprises a plurality of channel-like telescoping sections 13, 14 and 15 having sufficient length when extended to project beneath the axle and outwardly beyond the bumper.

The inner end section 13 is made preferably of relatively heavy sheet metal, and the sections 14 and 15 are formed of lighter sheets. The sections include side flanges 16 and inwardly extending keeper flanges 17 on the upper edges of the side flanges.

Longitudinal slots 18 and 19 formed respectively in the sections 13 and 15 receive pairs of pins 20 and 21 projecting laterally from the flanges of the middle section 14, whereby the end sections are retained in engagement with the middle section and may slide into and out of nesting relation therewith.

Attention is called to the diminishing cross section and increasing length of the sections from the end section 13 to the opposite end section 15, and the fact that the section 15 slides in and on the section 14, while the section 14 slides in and on the section 13.

The end section 13 comprises a supporting or footing member for retaining the jack in operating position, and is provided with a stop member 22 adapted to effect location of the jack in a central position thereon, to cause the weight of the car-supporting jack to be distributed substantially equally in all directions over the ground surface. The member 22 preferably comprises a cross bar having depending pins 23 at each end adapted for insertion in selected openings 24 in the keeper flanges of the section.

A chain 25 attached to the bar is connected to a rear end wall 26 comprising an extended and upturned portion of the bottom of the section, for retaining the bar with the section. The lower edge of the end wall 26 at its joint with the bottom is curved to facilitate sliding movement of the track along the ground.

The sizes and shapes of jack standards vary, and to accommodate a particular jack, the bar pins are inserted in selected openings to position the bar so that the jack will be stopped by the bar in such a position that the weight will be applied substantially centrally to the bottom of the section 13.

When the jack is to be used the track is extended, and this may easily be accomplished by grasping the outer end section 15 by extending the fingers through an opening 27 formed in the forward end of the section and permitting the other sections to move away by gravity.

The extended track is introduced under the end of the automobile and laid on the ground, the operator effecting the location of the inner end section 13 beneath the axle by observing the position of the axle.

The jack is then mounted on the outer section 15 of the track, the plate base 7 being inserted in the grooves formed by the side and keeper flanges, the standard projecting upwardly and being freely movable between the edges of the keeper flanges.

The jack is then moved slidably along the track, until stopped by the bar 22, and is thus suitably located to engage the axle.

The lever handle may be employed for shifting the jack along the track, whereby troublesome stooping and reaching to locate the jack beneath the axle are avoided.

When the use of the jack is finished, the jack and track may be removed separately or together.

The track may then be telescoped for storage in the tool box of the automobile.

Attention is called to the fixed relation between the jack position on the inner end section and selected positions on the track, and a point may be designated on the track which would register with a fixed point on the automobile, for example the edge of the bumper, when the inner end section is properly located beneath the axle to receive the jack.

The user may therefore locate the track in the dark, by relating the selected point on the track with the suitable point on the automobile, and thus avoid troublesome efforts to discover the position on the ground at which the jack should be installed.

The device is therefore useful for facilitating location of the jack, whatever the nature of the surface on which the automobile stands, and is useful for supporting the jack when the road is soft or irregular, or when the motorist must move the automobile from the road slab to soft dirt for replacing a tire.

What I claim and desire to secure by Letters Patent is:

A jack track comprising a footing member having vertical integral edge flanges provided with longitudinal slots and keeper flanges extending inwardly from said vertical flanges and provided with a plurality of pairs of apertures, a stop member comprising a bar having lugs receivable in a selected pair of said apertures of said keeper flanges, a guide member comprising a plate having integral upturned horizontal edge portions and flanges extending inwardly from said portions, and lugs projecting laterally from said upturned portions and operating in said slots for movably connecting the guide member to the footing member.

In testimony whereof I affix my signature.

ROLLO E. EVANS.